United States Patent
Ganton et al.

(10) Patent No.: US 7,298,765 B2
(45) Date of Patent: Nov. 20, 2007

(54) SYSTEM AND METHOD FOR MULTIPLEXING DIGITAL AND ANALOG SIGNALS USING A SINGLE ELECTRICAL CONNECTOR

(75) Inventors: Robert B. Ganton, San Diego, CA (US); James V. Pieronek, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 1045 days.

(21) Appl. No.: 10/366,983

(22) Filed: Feb. 14, 2003

(65) Prior Publication Data

US 2004/0160993 A1    Aug. 19, 2004

(51) Int. Cl.
*H04B 1/38* (2006.01)

(52) U.S. Cl. ......................................... 370/537; 710/63
(58) Field of Classification Search ................ 370/537; 710/63, 64
See application file for complete search history.

(56) References Cited

U.S. PATENT DOCUMENTS 6,862,636 B2 *   3/2005   Young ......................... 710/69

| | | | |
|---|---|---|---|
| 7,103,381 B1 * | 9/2006 | Wright et al. ............... | 455/557 |
| 7,184,794 B2 * | 2/2007 | Hess et al. .................. | 455/559 |
| 2004/0228369 A1 * | 11/2004 | Simmons, III .............. | 370/537 |

* cited by examiner

*Primary Examiner*—Melvin Marcelo (57) ABSTRACT

A system and a method are provided for multiplexing digital and analog signals to and from a device using a single electrical connector. The system includes a connector with at least four lines and analog and digital interfaces attached to the connector. The interfaces share: first and second analog-to-digital converters (ADCs); and first, second, and third switches. The analog interface includes an audio sub-system with a third ADC and first, second, and third digital-to-analog converters (DACs). The digital interface includes a digital sub-system. The switches have first terminals attached to the connector, second terminals connected to the third ADC and the DACs. The switches open in response to a digital mode signal, enabling a digital signal path from the digital interface terminals to the connector. The switches close in response to an analog mode signal, enabling an analog signal path from the connector to the audio sub-system.

32 Claims, 7 Drawing Sheets

SYSTEM AND METHOD FOR MULTIPLEXING DIGITAL AND ANALOG SIGNALS USING A SINGLE ELECTRICAL CONNECTOR

BACKGROUND OF THE INVENTION

1. Field of the Invention

This invention generally relates to electrical signal connector interfaces and, more particularly, to a system and method for using a single electrical connector to multiplex digital and analog signals to and from a device.

2. Description of the Related Art

Connectors are used to interface devices for the purpose of communicating signals or power. These signals can include digital data signals and analog signals. The following discussion is directed to audio analog signals. However, the discussion applies to other types of analog signals as well. Typically, connectors are configured to accept one particular type of connector interface, for example, a jack. As is well known, there are a large variety of cable types and associated connector interfaces. Typically, each particular type of connector interface is configured to handle only one specific type of signal. For example, wireless communications devices may use a connector accepting a four-line jack for a headset. The lines from the jack supply an audio input signal from a microphone in the headset, accept an audio output signal for a mono speaker in the headset or audio output signals for stereo speakers in the headset, and ground the headset to the device. The connector for the headset jack does not accept other types of cable connectors. For example, a separate connector, incompatible with the headset jack, is used to send and receive digital signals through an alternate port. In addition, separate sub-systems are typically used in a wireless communications device to supply and accept different types of signals to and from a connector in the device. The sub-systems may have different operating parameters and sensitivities and are typically not designed to handle other types of signals. For example, voltages associated with an audio signal could damage digital data signal circuits. Therefore, using separate, incompatible connectors in a wireless device serves the purpose of protecting circuitry in the device from the inadvertent application of potentially damaging signals to the circuitry. For example, as noted above, a user cannot inadvertently insert the headset jack into a digital data connector.

Therefore, it is known to use separate connectors to accept and supply digital and analog signals. However, there are disadvantages associated with the use of separate connectors for different signal types. A wireless communications device is used as an example to illustrate these disadvantages. However, it should be appreciated that these disadvantages apply to other portable devices and non-portable devices as well. Advances in technology and manufacturing techniques permit wireless communications devices to be made increasingly smaller, which in turn, creates a need to reduce the space required for components in the devices by reducing the number and/or size of the components.

Unfortunately, providing separate connectors increases the component parts count in a wireless device. The subsequent increase in space usage can limit the size to which a wireless device can be reduced, or can limit space available in the wireless device for other components. Increasing the parts count for a wireless device also adds to the cost of producing the wireless device. Since general reliability decreases as parts count in a wireless device increases, increasing the parts count by using separate connectors also decreases the reliability of the wireless device.

It would be advantageous if the number of connectors used in a device to accept and supply digital and analog communication signals could be reduced.

SUMMARY OF THE INVENTION

The present invention addresses connectors in a device used to accept and supply communication signals. The invention recognizes that space and costs for components are concerns in the manufacture of most devices, particularly portable devices, such as wireless communications devices. The invention also recognizes that reduced reliability associated with increased component parts count in a device is a concern. The invention addresses these problems by using a single connector to supply and accept digital and analog signals, thereby reducing component parts count and associated space, cost, and reliability concerns.

Accordingly, a system is presented for multiplexing digital and analog signals to and from a device using a single electrical connector. The system includes a connector with at least four lines and analog and digital interfaces attached to the connector. The interfaces supply communication signals to, and accept communication signals from the connector. The interfaces share: first and second analog-to-digital converters (ADCs); first, second, and third switches; and a controller to supply mode signals. The analog interface includes an audio sub-system with a third ADC and first, second, and third digital-to-analog converters (DACs). The digital interface includes a digital sub-system. The switches have first terminals attached to the connector, second terminals connected to the third ADC and the DACs, and inputs to accept the mode signals. The switches open in response to a digital mode signal, enabling a digital signal path from the digital interface terminals to the connector. The switches close in response to an analog mode signal, enabling an audio signal path from the connector to the third ADC and the DACs.

Additional details of the above-described system, and a method for multiplexing digital and analog signals to and from a device using a single electrical connector are provided below.

DETAILED DESCRIPTION OF THE PREFERRED EMBODIMENTS

Figure 1:
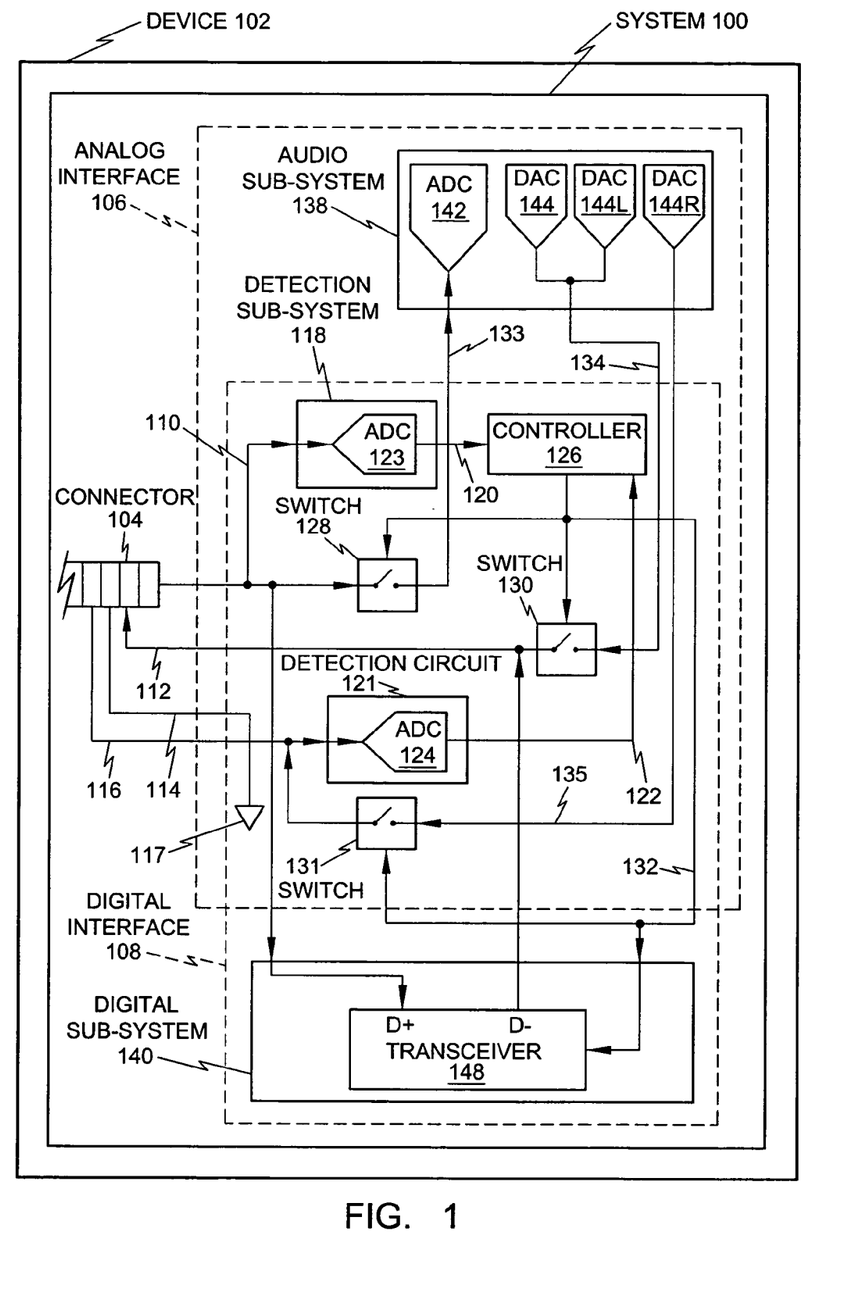
FIG. 1 is a schematic block diagram depicting a Universal Serial Bus (USB) embodiment of the system for multiplexing digital and analog signals to and from a device using a single electrical connector.

FIG. 1 is a schematic block diagram depicting a Universal Serial Bus (USB) embodiment of the system 100 for multiplexing digital and analog signals to and from a device using a single electrical connector. The system 100 in FIG. 1 is configured for a USB digital mode. However, it should be appreciated that the present invention is applicable to other digital communication modes, particularly Recommended Standard–232 (RS-232), as described below. The system 100 is applicable to a device 102 and includes a connector with at least four lines. In FIG. 1, a four-line connector 104 is used as an example. Connector 104 accepts a four-wire jack (not shown). Although a male connector is used to describe aspects of the system, it should be appreciated that the system can be enabled with other connector styles.

The jack and the connector 104 are used to receive communication signals for the device 102 from equipment (not shown) attached to the jack and to supply communication signals from the device 102 to equipment attached to the jack. As noted in the above Background Section, device connectors typically accept and supply one particular type of communication signal. In the system 100, however, the connector 104 accepts both digital and analog communication signals. That is, the system 100 can operate in a digital mode or an analog mode. A wireless communications device is used as an example to discuss the operation of the system 100. However, it should be appreciated that the discussion of system 100 also is applicable to other portable devices and non-portable devices as well.

At least two factors contribute to the system 100 capability of operating in both digital and analog modes in a wireless communications device. First, it is relatively uncommon for a wireless device to simultaneously operate in both digital and analog modes. Therefore, it is possible, in most cases, for a single connector to accommodate both digital and analog signals. Second, with care, the states required for USB and RS-232 digital signals to provide the information needed by devices receiving the digital signals can be chosen to match the requirements of the analog portion of a wireless device, allowing the same lines to be used for digital and analog signals. To accomplish both analog and digital communication, the system 100 includes an analog interface 106 and a digital interface 108. The analog interface 106 and the digital interface 108 share lines 110, 112, 114, and 116 to the connector 104 and these lines are used for supplying and accepting analog and digital communication signals to and from the connector 104, as further described below. In both a digital and an audio analog mode of operation, the line 114 is connected to a device ground 117.

The analog interface 106 and the digital interface 108 share a first detection sub-system 118 with an input to accept communication signals on line 110. Detection sub-system 118 has an output to supply identification signals on line 120 in response to the communication signals on line 110. The interfaces 106 and 108 also share a second detection sub-system 121 with an input to accept communication signals on line 116. Detection sub-system 121 has an output to supply identification signals on line 122 in response to the communication signals on line 116. The detection sub-systems 118 and 121 are used to detect and identify communication signals (analog or digital) on lines 110 and 116, respectively "on the fly". That is, the detection sub-systems 118 and 121 detect and identify the communication signals without input or instructions from the device 102 user or reconfiguration of the system 100. The detection sub-system information is used by the system 100 to automatically switch operations between digital and analog modes as described below. The detection sub-system 118 includes a first analog-to-digital converter (ADC) 123 connected to the detection sub-system 118 input on line 110. The detection sub-system 121 includes a second ADC 124 connected to the detection sub-system 121 input on line 116. The ADC 123 and the ADC 124 supply digital identification signals on lines 120 and 122, respectively, in response to digital communication signals on lines 110 and 116, respectively. The ADC 123 and the ADC 124 supply analog identification signals on lines 120 and 122, respectively, in response to analog communication signals on lines 110 and 116, respectively.

The analog interface 106 and the digital interface 108 also share a controller 126, a first switch 128, a second switch 130, and a third switch 131. The controller 126 has inputs to accept the identification signals on lines 120 and 122 and an output to supply a mode signal on line 132 in response to the identification signals. The switch 128 has a first terminal connected to line 110, a second terminal connected to line 133, and an input to accept the mode signal on line 132. The switch 130 has a first terminal connected to line 112, a second terminal connected to line 134, and an input to accept the mode signal on line 132. The switch 131 has a first terminal connected to line 116, a second terminal connected to line 135, and an input to accept the mode signal on line 132. The identification signals from ADC 123 and ADC 124 identify the type of communication to be performed in the system 100 and the controller 126 supplies mode signals on line 132 containing instructions for the appropriate multiplexing mode, accordingly. Therefore, the controller 126 supplies a digital mode signal on line 132 in response to a digital identification signal on line 120 or 122. It will be understood that line 132, as with other lines, such as line 120, could be multiple lines. The controller 126 supplies an analog mode signal on line 132 in response to an analog identification signal on line 120 or 122. The operation of the switches 128, 130, and 131, in response to the mode control signal on line 132, is discussed below.

The analog interface 106 includes an audio sub-system 138 with a first terminal connected to line 133, a second terminal connected to line 134, and a third terminal connected to line 135. The system 100 in FIG. 1 (and in FIGS. 2 and 3 below) is configured for audio analog communication. However, it should be appreciated that other analog communication configurations are applicable to the system. The digital interface 108 includes a digital sub-system 140 with a first terminal connected to line 110, a second terminal connected to line 112, and an input to accept the mode signal on line 132. The audio sub-system 138, the digital sub-system 140, and the connector 104 exchange communication signals via communication signal paths controlled by switches 128, 130, and 131 in response to mode signals on line 132. Switches 128, 130, and 131 open in response to a digital mode signal on line 132. Opening the switches 128, 130, and 131 isolates the audio sub-system 138 and creates digital signal paths on lines 110 and 112 from the connector 104 to the digital sub-system 140. Switches 128 and 130 close in response to an analog mode signal on line 132. Closing the switches 128 and 130 creates audio signal paths from the connector 104 to the audio sub-system 138 via lines 110 and 112. The operation of the switch 131 in the analog mode, as well as the operation of sub-systems 138 and 140 is further described below.

The audio sub-system 138 includes a third ADC 142 connected to line 132 and first and second digital-to-analog converters (DACs) 144 and 144L connected to line 134. Audio sub-system 138 also includes a third DAC 144R connected to line 135. When configured for audio analog operation, the system 100 can operate in a mono audio mode or a stereo audio mode. The determination of a mono or stereo mode in the device 102 is described below. Supplying input signals to the DACs 144, 144L, and 144R, and accepting audio output signals from the ADC 142 is performed by systems (not shown) outside the system 100.

When the system 100 is operating in either the mono or the stereo audio mode, the ADC 142 accepts an audio input signal from the connector 104 via line 133, the switch 128 and line 110. In the mono audio mode, the DAC 144 supplies a mono audio output signal to the connector 104 via lines 134 and 112 and switch 130. In addition, the switch 131 is opened and line 116 is grounded by systems (not shown) outside the system 100. Some mono headsets connect the third and fourth rings of a jack (not shown), causing the fourth ring (corresponding to line 116) to be grounded when the third ring on the jack contacts the third connector line (line 114), which is grounded as noted above. When the system 100 is operating in the stereo audio mode, the switches 128, 130, and 131 close, the DAC 144L supplies a stereo audio output signal on line 134, and DAC 144R supplies a stereo audio output signal on line 135.

On line 110, audio communication signals are associated with an audio input signal on line 110 or signals supplied to line 110 by equipment attached to the jack in response to an audio output signal supplied by device 102 on lines 112 or 116. Audio communication signals on line 116 are typically associated with a ground path (as described above) or voltage or impedance on line 116, as described below.

In the USB digital mode configuration shown in FIG. 1, the digital sub-system 140 includes a USB transceiver 148. The USB transceiver 148 has a D+terminal connected to the first digital sub-system 140 terminal on line 110, a D− terminal connected the second digital sub-system 140 terminal on line 112, and an input to accept mode signals on line 132. The ADC 123 and the ADC 124 supply USB digital identification signals in response to detecting USB digital communication signals on lines 110 and 116, respectively. Then, the controller 126 supplies a USB digital mode signal on line 132, opening switches 128, 130, and 131, as described above. USB data is transmitted on lines 110 and 112, using the digital signal path.

USB communication requires the use of at least a four-wire cable. Two of the wires (lines 110 and 112) are for data transmission as noted above, and two of the wires can be used to transfer power. In one case, line 116 can accept power from a power supply (not shown) connected to a jack inserted in connector 104. Examples of devices (not shown) that can supply power to the device 104 include, but are not limited to, a computer with a USB bus, a charging accessory, and a power adapter in an automobile. Line 116 also can be used to supply power from the device 102. Power supplied on line 116 by the device 102 can be used by an accessory device (not shown) connected to a jack inserted in connector 104. Line 114 is used to complete the USB power circuit. USB digital communication signals on line 110 are associated with data transmissions on line 110. USB digital communication signals on line 116 are discussed below.

Figure 1A:
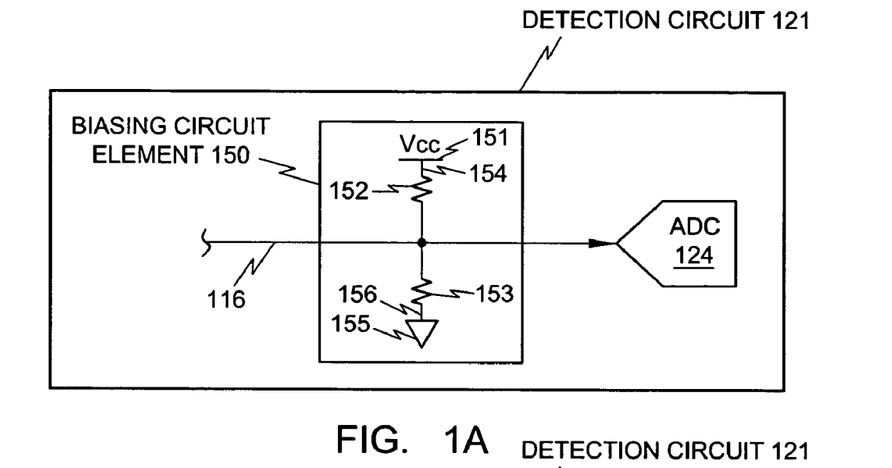
FIGS. 1A, 1B, and 1C are schematic block diagrams depicting a biasing circuit element for the detection circuit shown in FIG. 1.
Figure 1B:
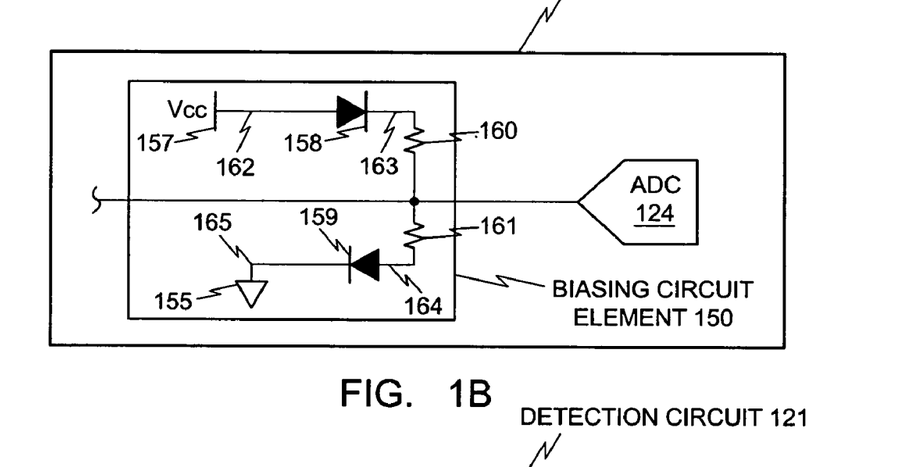
Figure 1C:
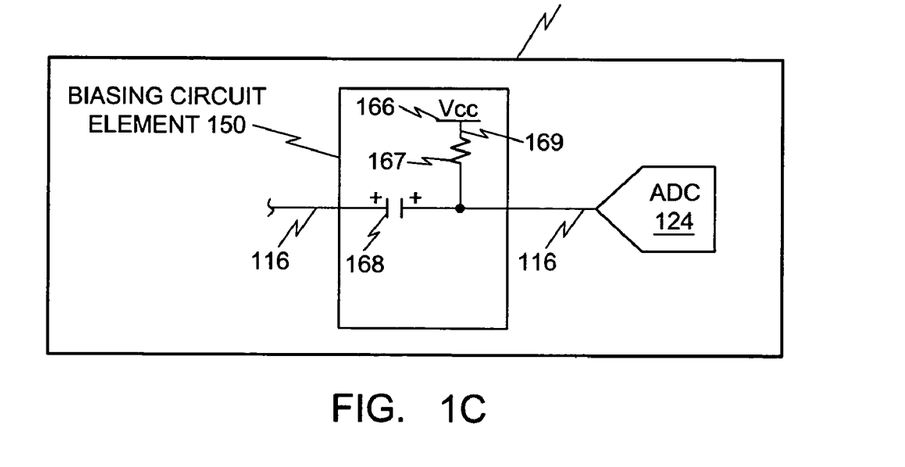

FIGS. 1A, 1B, and 1C are schematic block diagrams depicting a biasing circuit element for the detection circuit shown in FIG. 1. In FIG. 1A, the biasing circuit element 150 includes a power supply 151 and resistors 152 and 153. Power supply 151 is connected to a resistor 152 first port on line 154. A resistor 152 second port is connected to line 116. A resistor 153 first port is connected to line 116 and a second port connected to a ground 155 on line 156.

In FIG. 1B, the biasing circuit element 150 includes a power supply 157, diodes 158 and 159, and resistors 160 and 161. Power supply 157 is connected to a diode 158 first port on line 162. A diode 158 second port is connected to a resistor 160 first port on line 163. A resistor 160 second port is connected to line 116. A resistor 161 first port is connected to line 116 and a second port is connected to a diode 159 first port on line 164. A diode 159 second port is connected to ground 155 on line 165.

In FIG. 1C, the biasing circuit element 150 includes a power supply 166, a resistor 167, and a capacitor 168. Power supply 166 is connected to a resistor 167 first port on line 169. A resistor 167 second port is connected to line 116. Capacitor 168 has a first port connected to line 116 and a second port connected to line 116.

In some aspects of the system 100, pull-up and pull-down resistors (not shown) are used on lines 110 and 112. However, the pull-up resistor on line 112 may not be desirable for high-speed data transfer operations. These resistors can add functionality in some specific circumstances. The use of, and parameters of the resistors can depend on the supplied voltages in the system 100, the impedance of circuitry included in or interfacing with the system 100, and the desired impedance in the system 100. A biasing circuit element 150 in the detection circuit 121 can be used to create a voltage level in ADC 124 usable for identifying the type of device or accessory attached to a jack (not shown) inserted in the connector 104. The biasing circuit element 150 is not limited to the components and configuration shown in FIGS. 1A, 1B, and 1C. Other components and/or configurations also are applicable to the biasing circuit 150. The following examples illustrate the use of the biasing circuit element 150. The analog examples are based on the audio analog configuration of system 100 described above. However, it is understood that the examples apply equally to other analog communication configurations. The following are examples of detecting analog voltage. In the stereo audio mode, a speaker attached to line 116 via the connector 104 typically has low resistance, which the ADC 124 detects as a near ground voltage. In response, the ADC 124 supplies a stereo audio identification signal on line 122. When line 116 is grounded, as described above for the mono audio mode, the ADC 124 detects ground voltage. In response, the ADC 124 supplies a mono audio identification signal on line 122.

Following is an example of detecting digital voltage. If power is applied to the line 116, the ADC 124 detects a higher voltage and supplies a USB digital identification signal on line 122. Other devices attached to line 116 could result in the ADC 124 detecting voltages between the near ground and the applied power voltage levels. In these cases, the ADC 124 could be calibrated to supply identification signals corresponding to the other devices. If the bias circuit 150 is not included in the detection circuit 121, the varying resistances to ground with respect to line 116, associated with devices attached to line 116, could be used to identify these devices. Alternately, a mono or stereo mode could be selected by the device 102 user via a device user interface (not shown).

In some aspects of the system 100, operational amplifiers or transistors, including bi-polar transistors, are used for the switches 128, 130, and 131. In one aspect, field-effect transistors (FETs) are used. The gates of the FETs accept the mode signals on line 132 and the sources and drains of the FETs are used for the switch terminals described.

Figure 2:
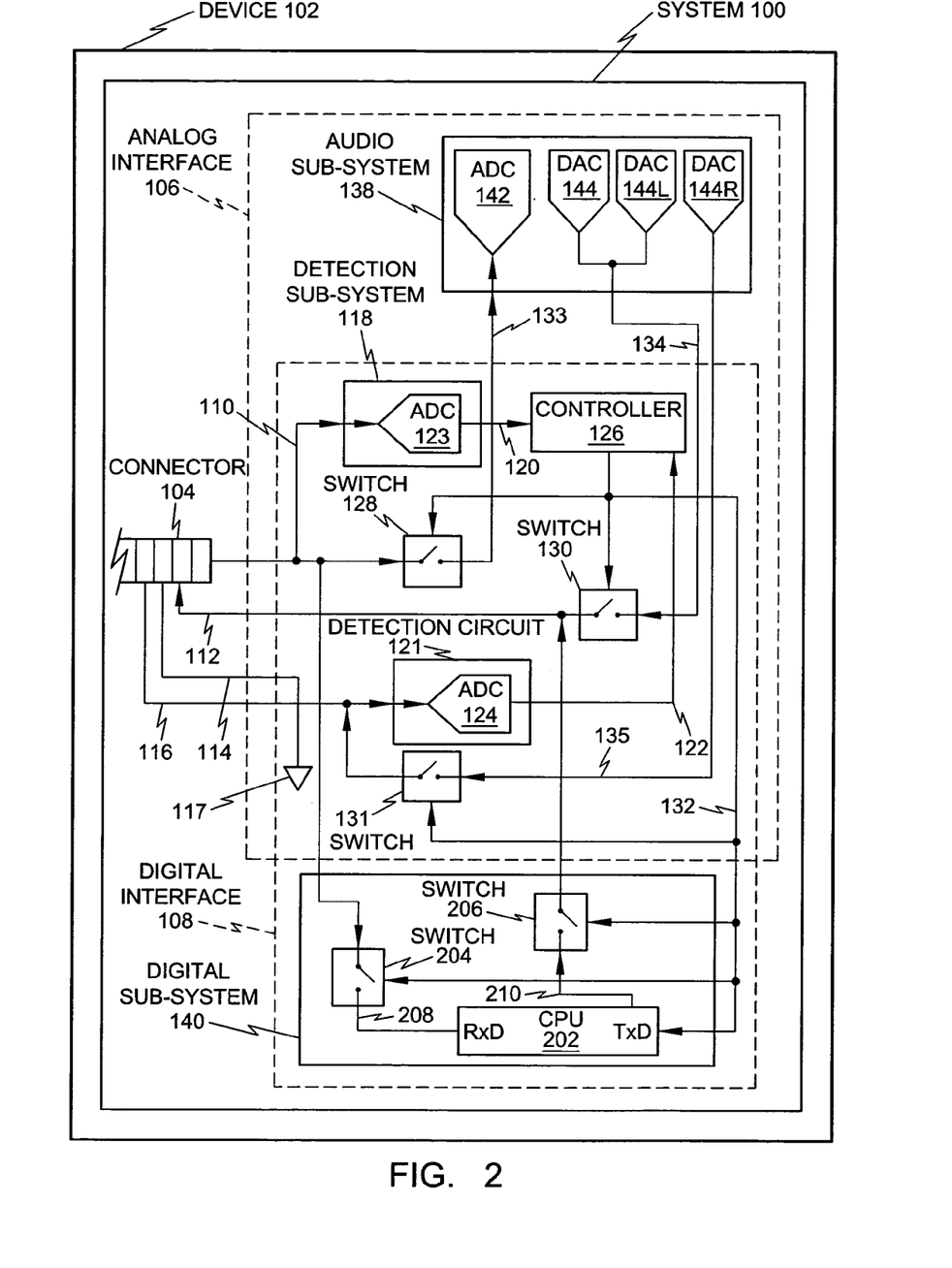
FIG. 2 is a schematic block diagram showing an RS-232 embodiment of the system for multiplexing digital and analog signals to and from a device using a single electrical connector.

FIG. 2 is a schematic block diagram showing an RS-232 embodiment of the system 100 for multiplexing digital and analog signals to and from a device using a single electrical connector. In the RS-232 digital mode, the digital subsystem 140 includes a Central Processing Unit (CPU) 202, a fourth switch 204, and a fifth switch 206. Switch 204 has a first terminal connected to line 110, a second terminal connected to a CPU Receive Data (RxD) terminal on line 208, and an input to accept the mode signal on line 132. Switch 206 has a first terminal connected to line 112, a second terminal connected to a CPU Transmit Data (TxD) terminal on line 210, and an input to accept the mode signal on line 132. The CPU 202 also has an input to accept mode signals on line 132. The switches 204 and 206 are used to isolate the RxD and TxD terminals from higher voltages present on lines 110 and 112 when the system 100 is operating in the audio analog mode. The ADC 123 supplies an RS-232 digital identification signal in response to an RS-232 digital communication signal on line 110. Then, the controller 126 supplies an RS-232 digital mode signal on line 132 opening switches 128, 130, and 131 and closing switches 204 and 206. RS-232 data signals are transmitted on line 110 and 112. Line 116 is not used in RS-232 digital mode. The switches 204 and 206 open in response to an analog mode signal. RS-232 digital communication signals on line 110 are associated with the transmission of RS-232 data on line 110. The use of pull-up and pull-down resistors on lines 110 and 112 is discussed above.

Figure 3:
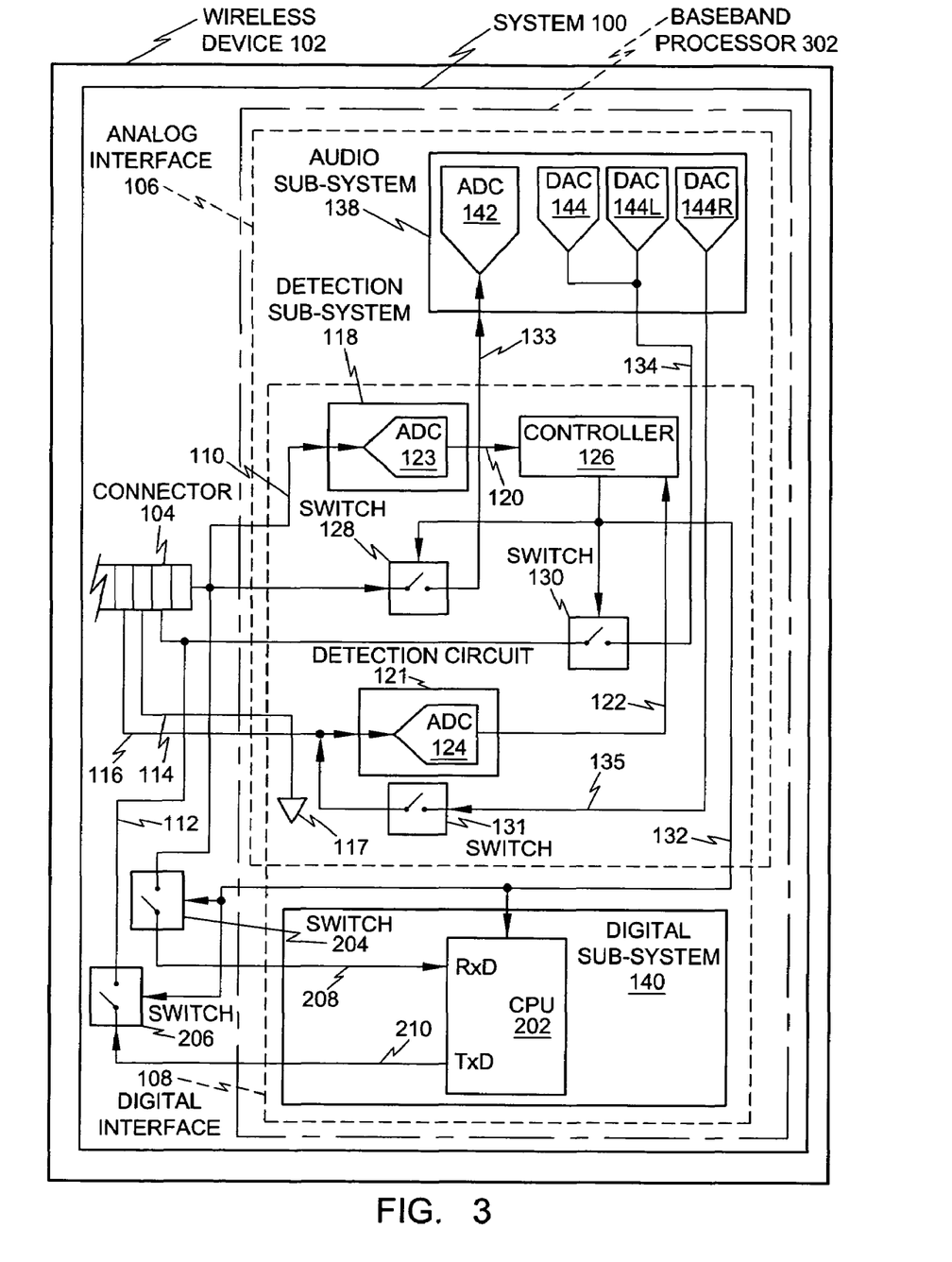
FIG. 3 is a schematic block diagram showing a baseband processor in an RS-232 embodiment of the system for multiplexing digital and analog signals to and from a device using a single electrical connector.

FIG. 3 is a schematic block diagram showing a baseband processor in an RS-232 embodiment of the system 100 for multiplexing digital and analog signals to and from a device using a single electrical connector. In FIG. 3, baseband processor 302 includes the analog interface 106 and the digital interface 108. However, the digital interface 108 is modified in this embodiment so that the switches 204 and 206 are external to the digital interface 108, and hence the baseband processor 302. The operation of this embodiment is as described above for FIG. 2. The baseband processor 302 can include functionality similar to that provided by the pull-up and pull-down resistors and the bias circuit element 150 described above, eliminating the need for these resistors and bias circuit element 150. A Mobile Station Modem (MSM) is one example of a baseband processor. It is understood that the system 100 also is applicable to other types of baseband processors.

In some aspects of the system 100, operational amplifiers or transistors, including bi-polar transistors, are used for the switches 204 and 206. In one aspect, field-effect transistors (FETs) are used. The gates of the FETs accept the mode signals on line 132 and the sources and drains of the FETs are used for the switch terminals described.

Figure 4:
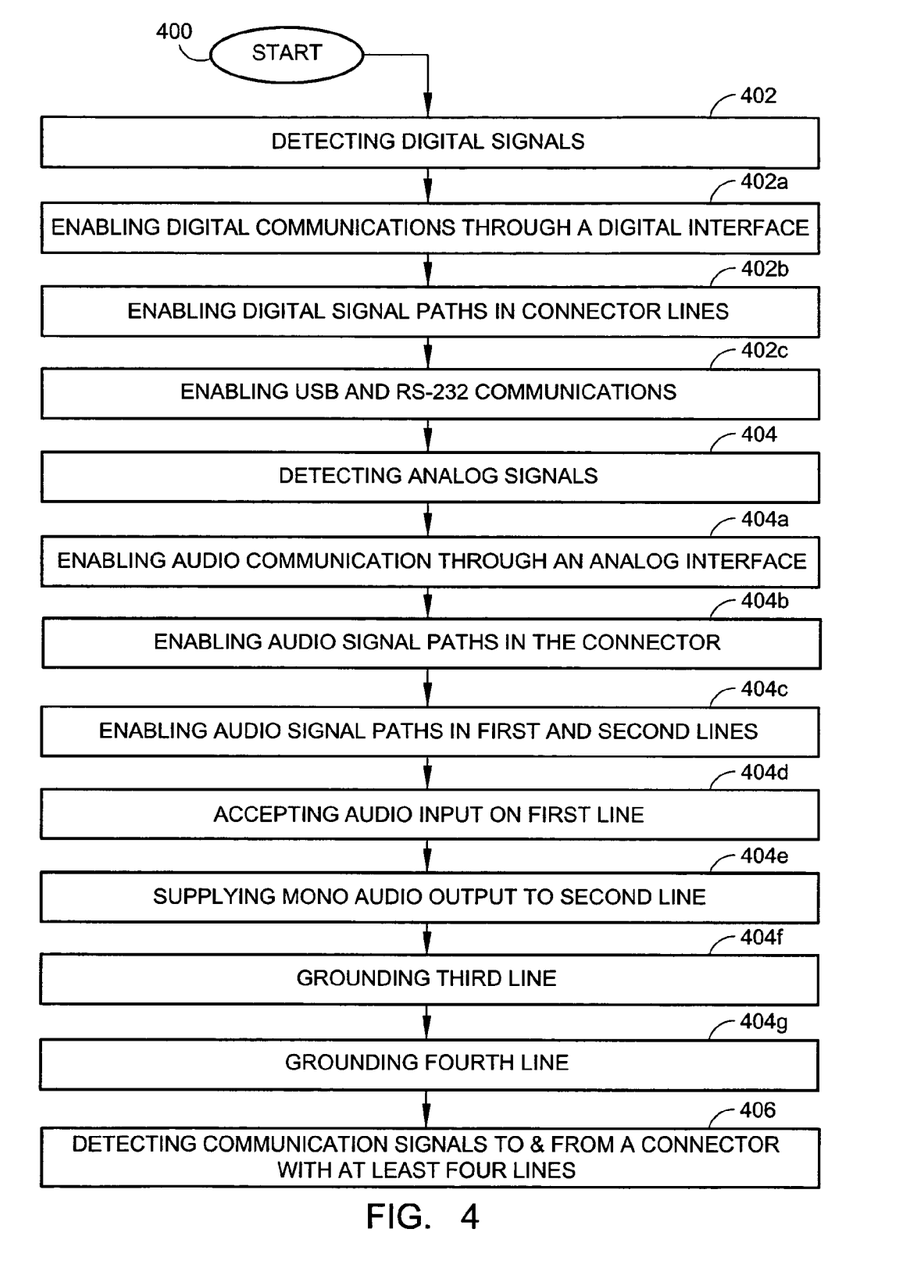
FIG. 4 is a flow chart illustrating the method for multiplexing digital and analog signals to and from a device using a single electrical connector.
Figure 5:
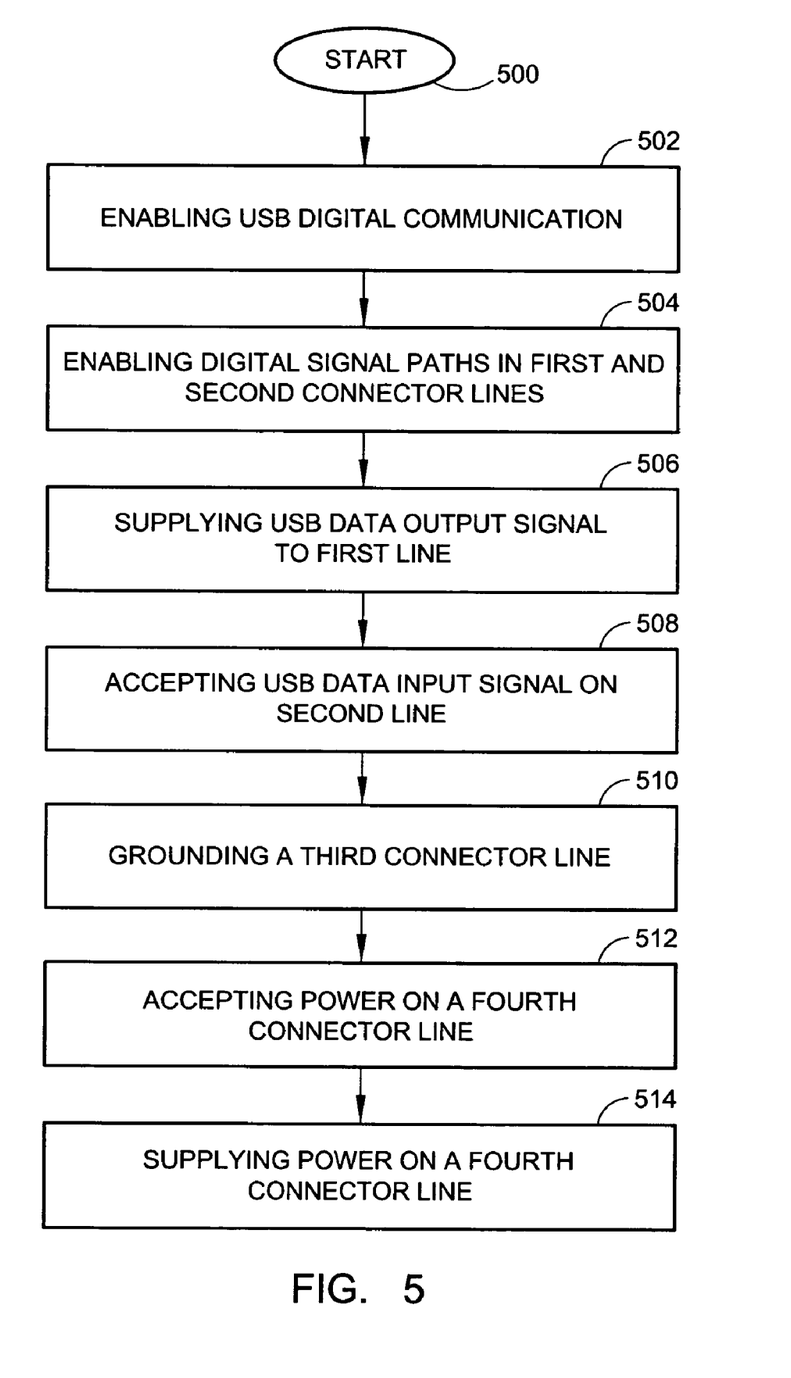
FIG. 5 is a flow chart showing in further detail the method illustrated in FIG. 4.
Figure 6:
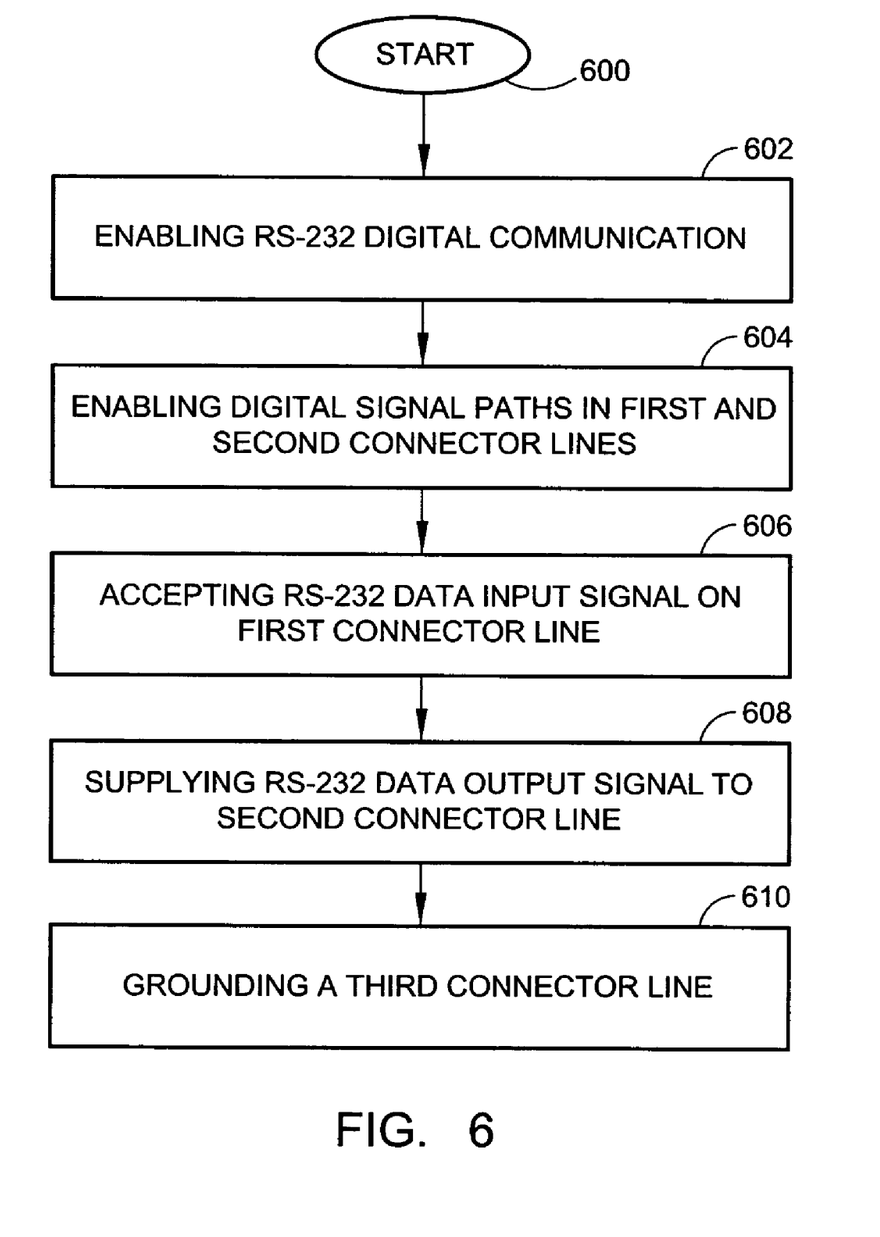
FIG. 6 is a flow chart showing in further detail the method illustrated in FIG. 4.

FIG. 4 is a flow chart illustrating the method for multiplexing digital and analog signals to and from a device using a single electrical connector. Although the method in FIG. 4 (and FIGS. 5 and 6 below) is depicted as a sequence of numbered steps for clarity, no order should be inferred from the numbering unless explicitly stated. In FIGS. 4, 5, and 6, a method multiplexes audio analog signals. However, it should be appreciated that other analog communication signals can be multiplexed using the method. The method starts at Step 400. Step 402 detects digital communication signals. Step 402a enables digital communication through a digital interface in response to detecting digital communication signals. Step 402b enables digital signal paths in the connector lines. Step 402c enables digital communication in a format selected from the group including USB and RS-232. Step 404 detects analog communication signals. Step 404a enables audio communication through an analog interface in response to detecting analog communication signals. Step 404b enables audio signal paths in the connector. Step 404c enables audio signal paths in first and second connector lines. Step 404d accepts an audio input signal on the first connector line. Step 404e supplies a mono audio output signal to the second connector line. Step 404f grounds the third connector line. Step 404g grounds the fourth connector line. Step 406 detects communication signals to and from a connector with at least four lines.

In one aspect of the method, Step 408 measures a voltage at a line coupled to the electrical connector. Then, enabling digital communication through a digital interface in Step 402a includes enabling digital communications responsive to measuring a digital voltage at the line. Then, enabling analog communication through an analog interface in Step 404a includes enabling analog communications responsive to measuring an analog voltage at the line. In another aspect of the method, measuring a voltage at a line coupled to the electrical connector in Step 408 includes coupling, through a resistor, a supply voltage to the line; grounding the line through a resistor; and, measuring, at the line, the voltage produced as a result of coupling the voltage supply and grounding the line. In one aspect of the method, measuring a voltage at a line coupled to the electrical connector in Step 408 includes coupling, through a resistor and a diode, a supply voltage to the line; grounding, through a resistor and a diode, the line; and, measuring, at the line, the voltage produced as a result of coupling the voltage supply and grounding the line. In another aspect of the method, measuring a voltage at a line coupled to the electrical connector in Step 408 includes coupling, through a resistor, a supply voltage to the line; supplying, through a capacitor, a communication signal on the line; and, measuring, at the line, the voltage produced as a result of coupling the voltage supply and supplying the signal through the capacitor.

In one aspect of the method, detecting analog communication signals in Step 404 includes accepting an analog voltage, converting the analog voltage to a digital signal, and interpreting the digital signal. In one aspect of the method, enabling audio signal paths in the connector lines in Step 404b includes supplying a first stereo audio output signal to the second connector line and supplying a second stereo audio output signal to the fourth connector line.

FIG. 5 is a flow chart showing in further detail the method illustrated in FIG. 4. The method starts at Step 500. Step 502 enables USB digital communication in response to USB digital communication signals. Step 504 enables digital signal paths in first and second connector lines. Step 506 supplies a USB data output signal to the first connector line. Step 508 accepts a USB data input signal on the second connector line. Step 510 grounds a third connector line. Step 512 accepts power on a fourth connector line. Step 514 supplies power on the fourth connector line.

FIG. 6 is a flow chart showing in further detail the method illustrated in FIG. 4. The method starts at Step 600. Step 602 enables RS-232 digital communication in response to RS-232 communication signals. Step 604 enables digital signal paths in first and second connector lines. Step 606 accepts an RS-232 data input signal on the first connector line. Step 608 supplies an RS-232 data output signal to the second connector line. Step 610 grounds a third connector line.

A system and a method are provided for multiplexing digital and analog signals to and from a device using a single electrical connector. Examples of the present invention have been enabled with a wireless communications device. However, it should be understood that the present invention is not limited to wireless communications devices or even to portable devices in general. The present invention system and method are applicable to any device that sends or receives digital and analog signals. Portable devices to which the present invention system is applicable also include lap top computers, personal digital assistants, and music players. Other variations and embodiments of the present invention will occur to those skilled in the art.

We claim:

1. A method for multiplexing digital and analog signals to and from a device using a single electrical connector, the method comprising:
    detecting digital communication signals on the electrical connector;
    in response to detecting digital communication signals, enabling digital communication through a digital interface;
    detecting analog communications signals on the electrical connector; and
    in response to detecting analog communication signals, enabling analog communication through an analog interface,
    wherein detecting communication signals includes detecting communication signals to and from a connector with at least four lines,
    wherein enabling digital communication through a digital interface includes enabling digital signal paths in the connector lines in response to detecting digital communication signals,
    wherein enabling analog communication through an analog interface includes enabling audio signal paths in the connector lines in response to detecting analog communication signals, and,
    wherein detecting an analog communication signal includes:
    accepting an analog voltage;
    converting the analog voltage to a digital signal; and,
    interpreting the digital signal.

2. A method for multiplexing digital and analog signals to and from a device using a single electrical connector, the method comprising:
    detecting digital communication signals on the electrical connector;
    in response to detecting digital communication signals, enabling digital communication through a digital interface;
    detecting analog communications signals on the electrical connector; and,
    in response to detecting analog communication signals, enabling analog communication through an analog interface,
    further comprising:
    measuring a voltage at a line coupled to the electrical connector, and,
    wherein enabling digital communication through a digital interface includes enabling digital communications responsive to measuring a digital voltage, and,
    wherein enabling analog communication through an analog interface includes enabling analog communications responsive to measuring an analog voltage and,
    wherein measuring a voltage at a line coupled to the electrical connector includes:
    coupling, through a resistor, a supply voltage to the line;
    grounding the line through a resistor; and,
    measuring, at the line, the voltage produced as a result of coupling the voltage supply and grounding the line.

3. A method for multiplexing digital and analog signals to and from a device using a single electrical connector, the method comprising:
    detecting digital communication signals on the electrical connector;
    in response to detecting digital communication signals, enabling digital communication through a digital interface;
    detecting analog communications signals on the electrical connector; and,
    in response to detecting analog communication signals, enabling analog communication through an analog interface,
    further comprising:
    measuring a voltage at a line coupled to the electrical connector, and,
    wherein enabling digital communication through a digital interface includes enabling digital communications responsive to measuring a digital voltage, and,
    wherein enabling analog communication through an analog interface includes enabling analog communications responsive to measuring an analog voltage, and,
    wherein measuring a voltage at a line coupled to the electrical connector includes:
    coupling, through a resistor and a diode, a supply voltage to the line;
    grounding, through a resistor and a diode, the line; and,
    measuring, at the line, the voltage produced as a result of coupling the voltage supply and grounding the line.

4. A method for multiplexing digital and analog signals to and from a device using a single electrical connector, the method comprising:
    detecting digital communication signals on the electrical connector;
    in response to detecting digital communication signals, enabling digital communication through a digital interface;
    detecting analog communications signals on the electrical connector; and,
    in response to detecting analog communication signals, enabling analog communication through an analog interface,
    further comprising:
    measuring a voltage at a line coupled to the electrical connector, and,
    wherein enabling digital communication through a digital interface includes enabling digital communications responsive to measuring a digital voltage, and,
    wherein enabling analog communication through an analog interface includes enabling analog communications responsive to measuring an analog voltage and,
    wherein measuring a voltage at a line coupled to the electrical connector includes:
    coupling, through a resistor, a supply voltage to the line;
    supplying, through a capacitor, a communication signal on the line; and, measuring, at the line, the voltage produced as a result of coupling the voltage supply and supplying the signal through the capacitor.

5. A system for multiplexing digital and analog signals to and from a device using a single electrical connector, the system comprising:

the connector with at least four lines;

an analog interface with at least four terminals, each terminal attached to a connector line to communicate analog signals; and, a digital interface with at least four terminals, each terminal attached to a connector line to communicate digital signals, wherein the analog and digital interfaces share:

a first detection sub-system with an input to accept communication signals on a first connector line and an output to supply identification signals in response to the communication signals; and, a second detection sub-system with an input to accept communication signals on a fourth connector line and an output to supply identification signals in response to the communication signals.

6. The system of claim 5 wherein the first detection sub-system includes a first analog-to-digital converter (ADC);

wherein the first ADC has an input to accept the communication signals from the first connector line; and, wherein the first ADC supplies digital identification signals in response to accepting digital communication signals and supplies analog identification signals in response to accepting analog communication signals.

7. The system of claim 6 wherein the second detection sub-system includes a second ADC;

wherein the second ADC has an input to accept the communication signals from the fourth connector line; and, wherein the second ADC supplies digital identification signals in response to accepting digital communication signals and supplies analog identification signals in response to accepting analog communication signals.

8. The system of claim 7 wherein the second detection sub-system includes a bias circuit element.

9. The system of claim 7 wherein the analog and digital interfaces share a controller with inputs to accept the identification signals from the detection sub-systems and an output to supply a mode signal in response to the identification signals; and, wherein the controller supplies a digital mode signal in response to digital identification signals; and, wherein the controller supplies an analog mode signal in response to analog identification signals.

10. The system of claim 9 wherein the analog and digital interfaces share:

a first switch with a first terminal connected to the first connector line, a second terminal, and an input to accept the mode signals;

a second switch with a first terminal connected to a second connector line, a second terminal, and an input to accept the mode signals; and, a third switch with a first terminal connected to the fourth connector line, a second terminal, and an input to accept the mode signals; and, wherein the first, second, and third switches open in response to a digital mode signal, enabling a digital signal path; and, wherein the first, second, and third switches close in response to an analog mode signal, enabling an analog signal path.

11. The system of claim 10 wherein the analog interface includes an audio sub-system with a first terminal connected to the second terminal of the first switch, a second terminal connected to the second terminal of the second switch, and a third terminal connected to the second terminal of the third switch; and, wherein the analog interface terminals accept and supply audio communication signals when the analog signal path is enabled.

12. The system of claim 11 wherein the audio sub-system includes: a third ADC connected to the first audio sub-system terminal and a first digital-to-analog converter (DAC) connected to the second audio sub-system terminal; and, wherein the third ADC accepts and processes an audio input signal from the first audio sub-system terminal and the first DAC supplies a mono audio output signal to the second audio sub-system terminal.

13. The system of claim 12 wherein the fourth connector line is grounded.

14. The system of claim 12 wherein the audio sub-system includes a second DAC connected to the second audio sub-system terminal and a third DAC connected to the third audio sub-system terminal; and, wherein the second DAC supplies a stereo audio output signal to the second audio sub-system terminal; and, wherein the third DAC supplies a stereo audio output signal to the third audio sub-system terminal.

15. The system of claim 12 wherein the digital interface includes a digital sub-system with a first terminal connected to the first connector line and a second terminal connected to the second connector line; and, wherein the digital interface terminals accept and supply digital communication signals when the digital signal path is enabled.

16. The system of claim 15 wherein the digital sub-system includes a Universal Serial Bus (USB) transceiver;

wherein a USB transceiver D+ terminal is connected to the first digital interface terminal, a USB transceiver D− terminal is connected to the second digital interface terminal, and the USB transceiver has an input to accept mode signals;

wherein the first and second ADCs supply USB digital identification signals in response to USB digital communication signals on the first and fourth connector lines, respectively;

wherein the controller supplies a USB digital mode signal opening the first, second, and third switches in response to USB digital identification signals; and, wherein power is applied to the fourth connector line.

17. The system of claim 15 wherein the digital sub-system includes a Central Processing Unit (CPU) and fourth and fifth switches;

wherein the CPU has an input to accept mode signals;

wherein the fourth switch has a first terminal connected to the first digital interface terminal, a second terminal connected to a CPU Receive Data (RxD) terminal, and an input to accept mode signals; and, wherein the fifth switch has a first terminal connected to the second digital interface terminal, a second terminal connected to a CPU Transmit Data (TxD) terminal, and an input to accept mode signals.

18. The system of claim 17 wherein the first and second ADCs supply Recommended System-232 (RS-232) digital identification signals in response to RS-232 digital communication signals on the first and fourth connector lines, respectively;
  wherein the controller supplies an RS-232 digital mode signal opening the first, second, and third switches and closing the fourth and fifth switches in response to RS-232 digital identification signals; and,
  wherein the fourth and fifth switches open in response to an analog mode signal.

19. The system of claim 18 wherein the first through fifth switches are operational amplifiers.

20. The system of claim 18 wherein the first through fifth switches are transistors.

21. The system of claim 20 wherein the transistors are field-effect transistors (FETs).

22. The system of claim 15 further comprising:
  a baseband processor; and,
  sixth and seventh switches; and,
  wherein the baseband processor includes the analog and digital interfaces; and,
  wherein the digital interface includes a CPU.

23. The system of claim 22 wherein the CPU includes an input to accept mode signals, a Receive Data (RxD) terminal connected to the first digital sub-system terminal, and a Transmit Data (TxD) terminal connected to the second digital sub-system terminal;
  wherein the sixth switch has a first terminal connected to the first connector line, a second terminal connected to the first digital interface terminal, and an input to accept mode signals; and,
  wherein the seventh switch has a first terminal connected to the second connector line, a second terminal connected to the second digital interface terminal, and an input to accept mode signals.

24. The system of claim 23 wherein the first and second ADOs supply Recommended System-232 (RS-232) digital identification signals in response to RS-232 digital communication signals on the first and fourth connector lines, respectively;
  wherein the controller supplies an RS-232 digital mode signal opening the first, second, and third switches and closing the sixth and seventh switches in response to RS-232 digital identification signals; and,
  wherein the sixth and seventh switches open in response to an analog mode signal.

25. The system of claim 24 wherein the baseband processor is a Mobile Station Modem (MSM).

26. The system of claim 24 wherein the sixth and seventh switches are operational amplifiers.

27. The system of claim 24 wherein the sixth and seventh switches are transistors.

28. The system of claim 27 wherein the transistors are FETs.

29. The system of claim 8 wherein the bias circuit element includes:
  a first power supply with an output;
  a first resistor with a first port connected to the power supply output and a second port connected to the fourth connector line; and,
  a second resistor with a first port connected to the fourth connector line and a second port connected to ground.

30. The system of claim 8 wherein the bias circuit element includes:
  a second power supply with an output;
  a first diode with a first port connected to the power supply output and a second port;
  a third resistor with a first port connected to the first diode second port and a second port connected to the fourth connector line;
  a fourth resistor with a first port connected to the fourth connector line and a second port; and,
  a second diode with a first port connected to the fourth resistor second port and a second port connected to ground.

31. The system of claim 8 wherein the bias circuit element includes:
  a third power supply with an output;
  a fifth resistor with a first port connected to the power supply output and a second port connected to the fourth connector line; and,
  a capacitor with a first port connected to the connector on the fourth connector line and a second port connected to the second ADO on the fourth connector line.

32. A system for multiplexing digital and analog signals to and from a wireless communications device using a single electrical connector, the system comprising:
  a connector with at least four lines;
  first and second analog-to-digital converters (ADCs) accepting digital and analog communication signals from first and fourth connector lines, respectively, and supplying digital and analog identification signals, respectively, in response to the communication signals;
  a controller accepting the digital and analog identification signals and in response, supplying digital and analog mode signals, respectively;
  first, second, and third switches with first terminals attached to the first connector line, a second connector line, and the fourth connector line, respectively, second terminals, and inputs to receive the mode signals;
  a third ADO connected to the second terminal of the first switch, first and second digital-to-analog converters (DACs) connected to the second terminal of the second switch, and a third DAC connected to the second terminal of the third switch; and,
  a Universal Serial Bus (USB) transceiver with D+ and D− terminals connected to the first and second connecter lines, respectively, and an input to accept mode signals; and,
  wherein in response to analog mode signals:
    the first, second, and third switches close;
    the third ADC accepts an audio input signal;
    the first DAC supplies mono audio output signals; and,
    the second and third DACs supply stereo audio output signals; and,
  wherein the first, second, and third switches open in response to a USB digital mode signal and wherein power is applied to the fourth connector line.

* * * * *

UNITED STATES PATENT AND TRADEMARK OFFICE
CERTIFICATE OF CORRECTION

PATENT NO. : 7,298,765 B2
APPLICATION NO. : 10/366983
DATED : November 20, 2007
INVENTOR(S) : Ganton et al.

It is certified that error appears in the above-identified patent and that said Letters Patent is hereby corrected as shown below:

Claim 12, Column 12, Line 14
should read:

--includes: a third ADC connected to the first audio sub- --

Claim 24, Column 13, Line 36
should read:

--ADCs supply Recommended System-232 (RS-232) digital--

Claim 31, Column 14, Line 23
should read:

--to the second ADC on the fourth connector line.--

Claim 32, Column 14, Line 41
should read:

--a third ADC connected to the second terminal of the first--

Signed and Sealed this

Twenty-seventh Day of May, 2008

JON W. DUDAS
*Director of the United States Patent and Trademark Office*